Aug. 19, 1924.  1,505,694
E. W. BENTEL
PROCESS OF RUBBERIZING FABRIC
Filed Aug. 19, 1922
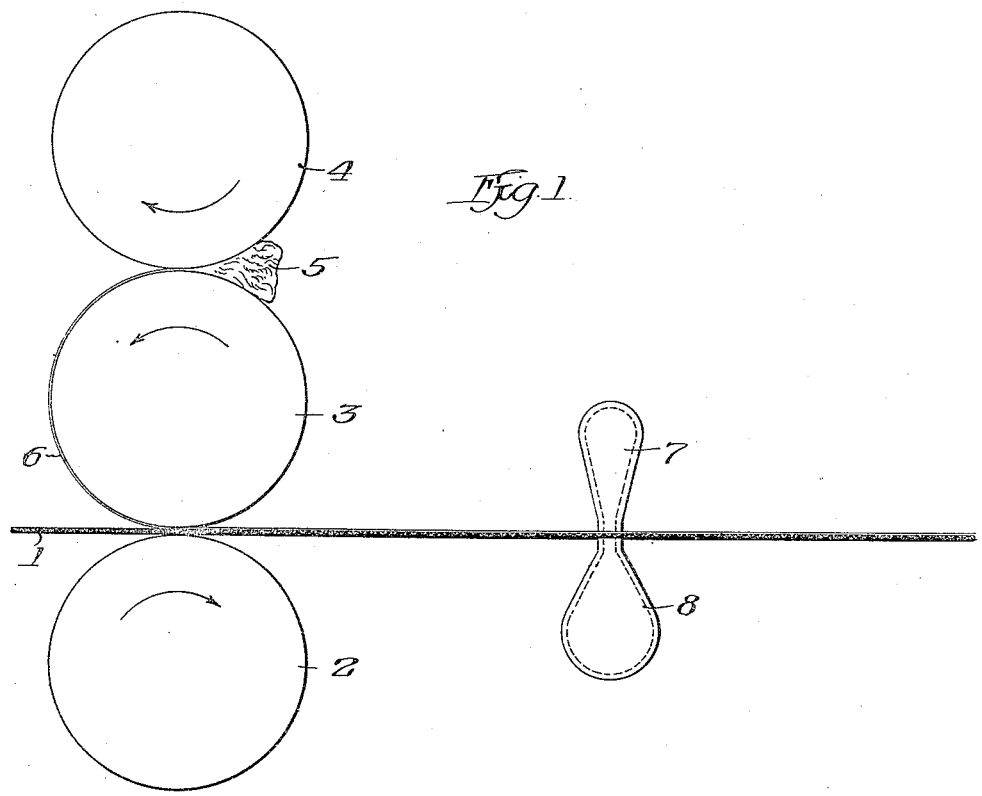
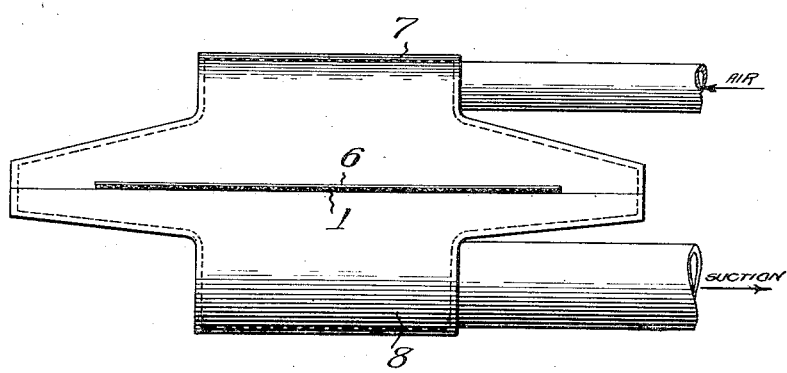

Patented Aug. 19, 1924.

1,505,694

UNITED STATES PATENT OFFICE.

EDMUND W. BENTEL, OF AKRON, OHIO, ASSIGNOR OF THREE-FIFTHS TO FRANK T. LAHEY AND ONE-FIFTH TO GEORGE J. HARTER, BOTH OF AKRON, OHIO.

PROCESS OF RUBBERIZING FABRIC.

Application filed August 19, 1922. Serial No. 582,874.

*To all whom it may concern:*

Be it known that I, EDMUND W. BENTEL, a citizen of the United States, and a resident of Akron, county of Summit, State of Ohio, have invented certain new and useful Improvements in Processes of Rubberizing Fabric, of which the following is a specification This invention relates to a method for the manufacture of rubberized fabric, which may be of general utility, but is especially adapted for use in the manufacture of tires, belts, hose, or the like.

In the manufacture of these articles, the fabric used in their construction is given a coating of rubber either by passing the fabric between the rolls of a calender which serve to force the rubber into the fabric, or by passing it through a bath or solution of rubber in some suitable solvent, or by a combination of both methods.

In either of these cases the rubber will form a superficial coating over the surface of the fabric, but it will be found that it does not completely penetrate and coat the entire surface of the threads to insulate them from one another. The method disclosed herein will force the rubber within the innermost recesses of the fabric and between the threads so that a more complete and thorough saturation of the fabric is obtained. Fabric, either cord or square woven, treated in the manner set forth herein, will be found to be greatly superior to the fabric rubberized by previous methods and upon examination of the fabric the rubber will be found to have flowed around the entire thread structure and to have penetrated within the threads themselves. One of the reasons for the failure of previous methods to obtain the complete and thorough saturation, I believe, is that the air within the interstices of fabric is entrapped there, while in my process all of the air is withdrawn and replaced by rubber.

The method of the present invention possesses other advantages of cheapness and simplicity of operation, which, combined with the thorough saturation obtained, contributes to the desirability of the process and its economical value.

In the drawings accompanying this application there is shown one type of apparatus for carrying out the process, it being obvious that the showing is diagrammatic and I am not limited to the type of apparatus shown nor to the exact procedure outlined as equivalent steps or means may be substituted without departing from the broad features of the invention as set forth in the claims attached hereto.

In the drawings:

Figure 1 is a side elevation of one type of apparatus which may be used; and

Figure 2 is an end elevation thereof.

Referring particularly to the embodiment of the invention, the fabric is indicated by the numeral 1. This may be of any type, either square woven or cord fabric, and is conducted between the lowermost and middle rolls 2 and 3 of a calender. Above the roll 3 is arranged a third roll 4, the rolls rotating in the direction of the arrows as in ordinary practice.

A mass of gum 5 is maintained within the bight of the rolls 3 and 4 which serve to pass it out as a thin sheet 6 which is thereby laid over the surface of the fabric and rolled in to a certain extent. The rolls of the calender are heated so that the rubber will form in a thin sheet and be hot and in a highly plastic condition. This layer may be of any suitable thickness so as to provide a sufficient quantity of rubber for carrying out the process.

The layer of fabric 1 with the sheet of rubber 6 superposed thereon is then passed within the field of a combined pneumatic pressure and suction so that the rubber is forced in from one side while it is drawn in from the other, the suction serving not only to draw the plastic rubber into the interstices of the fabric, but also to eliminate the air which is normally entrapped within the cellular structure of the fabric.

For accomplishing this step of the process, I may arrange a large trunk line chamber 7, the lower surface of which is open in a comparatively narrow outlet directly above and in close contact with the surface of the rubber. Below the surface of the fabric is arranged another trunk line chamber 8 which contacts with the under uncoated side of the fabric. Into the trunk 7 air at high pressure is forced, while suction is exerted on the trunk 8. The pressure on the upper surface forces the warm plastic rubber into the meshes of the fabric, which action is assisted by the withdrawal of the air from the fabric and the suction created by the trunk 8.

The fabric issuing from between 7 and 8 will be found to be thoroughly permeated with rubber in a higher degree than obtained by former rubberizing processes, and the fabric so obtained may be treated in any well known manner. Additional coats of rubber may be supplied, or the fabric may be cut into proper form to be manufactured into tires or other articles.

I believe that I am the first to provide for a combined pressure and suction to obtain a rubber coating or layer on fabric and as such I am entitled to a wide range of equivalents in the practice of the invention.

What I claim is:

1. A process of rubberizing fabric, comprising superposing a layer of rubber upon a sheet of fabric, subjecting the layer of rubber while it is in a warm, plastic condition to pneumatic pressure to force the rubber within the fabric, and at the same time exerting suction on the reverse side of the fabric.

2. A process of rubberizing fabric, comprising coating fabric on one side with a layer of rubber in plastic condition, subjecting the coated surface of the fabric to air pressure, and at the same time subjecting the uncoated surface of the fabric to suction to cause the rubber to penetrate the interstices of the fabric.

3. A process of rubberizing fabric, comprising coating fabric on one side with rubber in a plastic condition, and subjecting the coated surface of the fabric to pressure and the uncoated surface to suction to cause the rubber to penetrate the interstices of the fabric.

4. A process of rubberizing fabric, comprising calendering rubber into a thin, warm, plastic sheet, applying said sheet to a fabric, and subjecting the fabric above the sheet to pressure and below the sheet to suction to force the rubber within the body of the fabric.

EDMUND W. BENTEL.